Aug. 14, 1962    C. W. COCHRAN    3,049,585
WIRING CLIP
Original Filed Oct. 9, 1959

Inventor:
Clarence W. Cochran,
by Walter P. Jones
Atty.

United States Patent Office 3,049,585
Patented Aug. 14, 1962

3,049,585
WIRING CLIP
Clarence W. Cochran, deceased, late of Belmont, Mass., by Lois F. Cochran, administratrix, Belmont, Mass., assignor to United-Carr Fastener Corporation, Cambridge, Mass., a corporation of Delaware
Continuation of application Ser. No. 845,397, Oct. 9, 1959. This application Sept. 22, 1961, Ser. No. 140,976
6 Claims. (Cl. 174—164)

My invention aims to provide improvements in fasteners for wiring, tubing and the like and installations thereof.

An object of my invention is to provide a wiring, tubing and the like fastener preferably formed from a single piece of insulating plastic and having clamping means to grip the wiring, tubing, or any other suitable part to be held in position, and further having a latching means.

Another object of my invention is to provide a suitable fastener formed of insulating material constructed to hold a wire, tube or the like, or a plurality of them, in such a way that they cannot short circuit with a support, chafe or become accidentally loosened from the fastener.

Another object of the invention is to provide an improved assembly of a support, part to be supported, such as a tube, wire or the like, and a clamping fastener attached to the support, the fastener having latching means that may be opened and closed at will.

Other objects of my invention will be apparent from the following specification and claims.

In the drawings which illustrate preferred embodiments of my invention:

Figure 1:
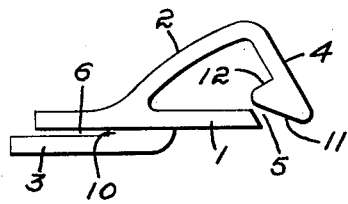
FIG. 1 is a side view of a clamping fastener.
Figure 2:
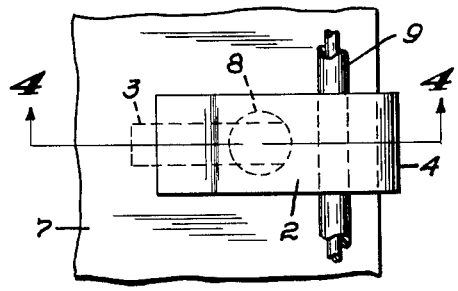
FIG. 2 is a plan view of the clamping fastener shown in FIG. 1 in assembly with a support and a wire to be supported.

Applicant is aware of the fact that many different fasteners have been used to hold wiring, tubing and the like in place upon various supporting structures. However, applicant has invented a new and useful fastener device and combination of parts in this art and will now proceed to describe his preferred fastener and installation.

In FIGS. 1 through 5 inclusive, there is illustrated a fastener device formed from a single piece of molded insulating flexible plastic material. This fastener is simple, inexpensive to construct and has a base portion 1, a clamping finger 2, attaching means 3 and latch portion 4. In the preferred construction of my fastener, I provide the latch portion 4 as an integral portion with the clamping finger 2. Any suitable arrangement of the base 1 and clamping finger 2 may be used but I prefer to superimpose the finger 2 over the base 1 and have a space 5 between the base 1 and the latch 4 so that a part to be held by the fastener may be inserted and withdrawn at will. My improved fastener may be attached to a support in any desired manner but, as illustrated, the attaching means 3 is connected to the base portion 1 at its underside and extends in spaced parallel relation to the base portion 1, thereby providing a groove 6 for receiving a portion of the support.

As illustrated in FIG. 1, the base portion 1 is substantially flat with the support entering member or attaching means 3 extending from one surface of the base portion in spaced, substantially parallel relationship therewith and in the direction of one end of the base portion 1 forming a groove 6 for receiving a thin support in a manner more fully described hereinafter. The flexible clamping finger 2 is secured at one end to the other or opposite surface of the base portion 1 and extends in angular relation therefrom and in the direction of the other or opposite end of the base portion 1 forming an area therebetween in which a wire or the like will be disposed. The latch portion 4 is secured to the free end of the clamping finger 2 and will lie in a position just beyond the forward free end of the base 1 when in an unlatched position to permit the ready insertion of a wire or the like therein. The latch portion 4, as shown in FIGS. 3 and 4, when in a latched position will lie below the undersurface of the base portion 1 and will engage the undersurface of the support to which the base portion 1 will be in engagement and extend in a direction therebelow.

Figure 3:
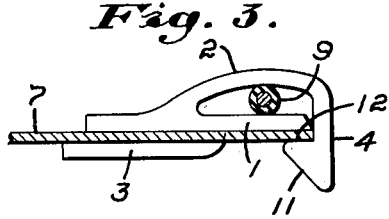
FIG. 3 is an edge view of the assembly shown in FIG. 2.
Figure 4:
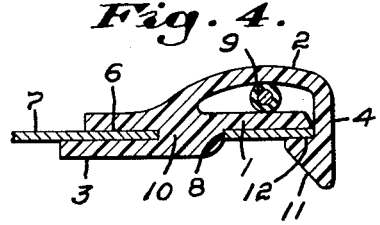
FIG. 4 is a section taken on the line 4—4 of FIG. 2.
Figure 5:
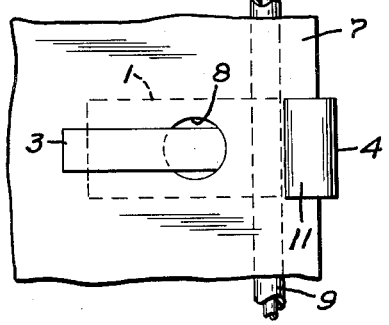
FIG. 5 is a bottom plane view of the construction shown in FIG. 2.

As an illustration of a manner in which the illustrative embodiment of the fastener made in accordance with my invention shown in FIG. 1 may be used, reference is to be had to FIGS. 2–5 wherein the fastener is shown in assembled relationship to a support 7 of thin material which is provided with an opening 8. A wire 9 is held in place relative to the support 7 by the fastener. As shown in FIGS. 3 and 4, the illustrative embodiment of the fastener is attached to the plate-like support 7 by tipping the attaching means 3 through the aperture 8 of the support 7 to a position where the base portion 1 and attaching member 3 grip opposite faces of the support 7 in parallel relationship therewith. As shown in FIGS. 3 and 4, this arrangement results in the base portion 1 having its bottom surface in parallel, abutting relationship with the top surface of the support 7 and with the top surface of the attaching means 3 in parallel, abutting engagement with the opposite face of the support 7. This, as illustrated in FIGS. 3 and 4, results in the base portion 1 having its opposite surface in non-abutting relationship with the support 7 with the clamping finger 2 extending from such non-abutting surface. As will be observed in FIG. 4, a connecting portion 10 passes through the aperture 8 and engages the plate at the aperture 8 to act as a stop against accidental displacement of the fastener from the support. The wire 9 may now be inserted through the space 5 and the finger 2 pressed toward the base portion 1. This action causes the cam like edge 11 of the latch portion 4 carried by the free end of the finger 2 to move the latch outwardly relative to the end of the base portion 1 until the shoulder 12 can be engaged beneath the support 7. As shown in FIGS. 3 and 4, the latch position 4 will extend below the abutting surface of the base portion 1 as well as below the lower or bottom surface of the support 7. Thus, the parts are locked together so that the wire 9 is retained between the base portion 1 and the finger portion 2, as clearly shown in FIGS. 3 and 4. In this position, the wire 9 is spaced from the support and is insulated therefrom so that if the covering of the wire becomes worn, no short circuit will result. The plastic material of the fastener is less apt to cause wear or cutting of the wire covering than was the case with previously used metal fasteners.

Another advantage of making my fastener of molded insulating plastic material is the fact that the fastener may be easily fabricated into shapes and sections that would be difficult or impossible to form from a single piece of sheet metal.

Figure 6:
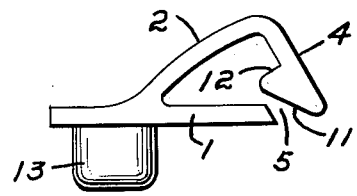
FIG. 6 is a side elevation of a modified form of fastener.
Figure 8:
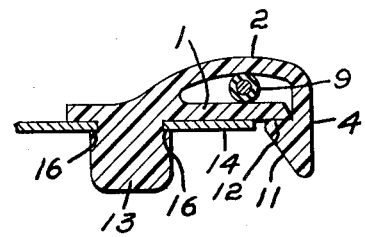
FIG. 8 is a section taken on the line 8—8 of FIG. 7.
Figure 7:
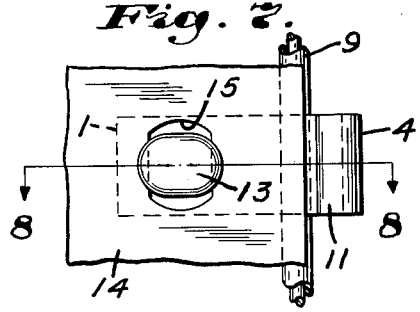
FIG. 7 is a bottom plan view of the modified form of fastener attached to a support and holding a wire.

A second form of fastener and installation illustrating my invention is shown in FIGS. 6, 7 and 8. In this instance, the fastener is substantially the same as the first described fastener except for the attaching means and the installation is different to the extent that the latch 4 is shorter and engages the under or abutting surface of the base portion 1 of the fastener, when latched, as compared to the first construction being latched to the support.

This modified fastener has an attaching boss 13 of non-circular cross section and it extends from beneath the base portion 1 in substantially transverse relationship thereto. To attach the fastener to a support 14, I provide an aperture 15 of similar shape to the cross section of the boss 13. Then I insert the boss 13 through the aperture 15 and turn the fastener 90° to a position shown in FIG. 7. This action causes the wall around the aperture 15 to cut grooves 16—16 into opposite sides of the boss 13 and in the plane of the support 14 (FIG. 8) thereby locking the fastener in place and preventing accidental axial withdrawal of the fastener.

The latching of the parts into clamping position is the same as described above with the form of the invention shown in FIGS. 1–5 except that the shoulder 12 of the latch portion 4 is engaged directly under the base portion 1 as shown in FIGS. 7 and 8.

As illustrated in FIG. 8, the boss 13 will extend below the support 7 and the base portion 1 in a direction substantially transverse relationship thereto but in a direction substantially parallel to the direction of the latch portion 4 when in a latched position. This arrangement has the advantage of not requiring the location of the fastener on the support so that it has to be in a specific position with relation to an edge or a hole.

While I have illustrated and described two embodiments of my invention, it should be understood that other constructions, including the same principles of formation of the parts of the fastener, may be made without departing from my inventions which are best defined by the following claims.

The present application is a continuation of my application Serial No. 845,397, filed October 9, 1959, now abandoned.

I claim:

1. A one-piece fastener formed from a single piece of insulation material for retaining wiring, tubing and the like adjacent an edge of a thin, flat support, said fastener comprising a substantially flat base portion having an abutting surface for abutting the surface of the support and an opposite non-abutting surface, a support-entering member extending from said abutting surface of said base portion in one direction, a flexible clamping finger extending in angular relation from the opposite non-abutting surface of said base portion and in the direction of one end of the base portion forming an area therebetween for receiving wiring, tubing and the like therein, a latch portion secured to the free end of said clamping finger, said latch portion when in latched position extending below one end of said base portion and its abutting surface in the direction of extension of said support-entering member therefrom.

2. A one-piece fastener formed from a single piece of insulation material for retaining wiring, tubing and the like adjacent an edge of a thin, flat support, said fastener comprising a substantially flat base portion having an abutting surface for abutting the surface of the support and an opposite non-abutting surface, a support-entering member extending from said abutting surface of said base portion in the direction of one end of said base portion and in spaced parallel relationship therewith, said support-entering member having an abutting surface for abutting the opposite surface of the support, a flexible clamping finger extending in angular relation from the opposite non-abutting surface of said base portion and in the direction of the opposite end of said base portion forming an area therebetween for receiving wiring, tubing and the like therein, a latch portion secured to the free end of said clamping finger for engaging the opposite surface of the support when in assembled relationship.

3. A one-piece fastener formed from a single piece of insulation material for retaining wiring, tubing and the like adjacent an edge of a thin, flat support, said fastener comprising a substantially flat base portion having an abutting surface for abutting the surface of the support and an opposite non-abutting surface, a support-entering member extending from said abutting surface of said base portion in a direction substantially transverse thereto, a flexible clamping finger extending in angular relation from the opposite non-abutting surface of said base portion and in the direction of one end of the base portion forming an area therebetween for receiving wiring, tubing and the like therein, a latch portion secured to the free end of said clamping finger for engaging the abutting surface of said base portion at the free end thereof, said latch portion when in latched position extending below the one end of said base portion and its abutting surface in a direction substantially parallel to the direction of extension of said support-entering member.

4. A fastening assembly securing wire, tubing and the like adjacent an edge of a thin, flat support comprising a thin, flat support member having an aperture adjacent an edge thereof, a one-piece insulating fastening device having a substantially flat base portion provided with an abutting surface in abutting relationship with one surface of said flat support member adjacent an edge thereof and an opposite, non-abutting surface, a support-entering member extending from the abutting surface of said base portion through the aperture of said support member in one direction to retain the fastening member thereto, a flexible clamping finger extending in angular relationship from the opposite non-abutting surface of said base portion and in the direction of the end edge of said base portion and the edge of said support member forming an area between said finger and said base portion in which wire, tubing and the like is positioned, a latch portion secured to the free end of said clamping finger and in latched assembly with at least one of said support member and said base portion to retain said wire, tubing, or the like in tight assembled relationship, said latch portion extending below said abutting surface of said base portion and said support member.

5. A fastening assembly securing wire, tubing and the like adjacent an edge of a thin, flat support comprising a thin, flat support member having an aperture adjacent an edge thereof, a one-piece insulating fastening device having a substantially flat base portion provided with an abutting surface in abutting relationship with one surface of said flat support member adjacent an edge thereof and an opposite, non-abutting surface, a support-entering member extending from the abutting surface of said base portion through the aperture of said support member in the direction of the end of said base portion remote from the edge of said support member and in spaced parallel relationship therewith, with said support entering member having an abutting surface in abutting engagement with the surface of said support opposite to that in abutting relationship with said base portion to retain the fastening member thereto, a flexible clamping finger extending in angular relationship from the opposite, non-abutting surface of said base portion and in the direction of the opposite end edge of said base portion and the edge of said support member forming an area between said finger and said base portion in which wire, tubing, and the like, is positioned, a latch portion secured to the free end of said clamping finger and in latched assembly with the surface of the base portion in abutting relationship with said support-entering member to retain said wire, tubing, or the like in tight assembled relationship, said latch portion extending below said support member.

6. A fastening assembly securing wire, tubing, and the like adjacent an edge of a thin, flat support comprising a thin, flat support member having an aperture adjacent an edge thereof, a one-piece insulating fastening device having a substantially flat base portion provided with an abutting surface in abutting relationship with one surface of said flat support member adjacent an edge thereof and an opposite, non-abutting surface, said base portion extending just beyond the edge of said support member, a support-entering member extending from the abutting surface of said base portion through the aperture of said support member in a direction substantially transverse to the plane of said support member to retain the fastening member thereto, a flexible clamping finger extending in angular relationship from the opposite, non-abutting surface of said base portion and in the direction of the end edge of said base portion and the edge of said support member forming an area between said finger and said base portion in which wire, tubing, and the like is positioned, a latch portion secured to the free end of said clamping finger and in latched assembly with the abutting surface of said base portion extending beyond the edge of said support member to retain said wire, tubing, or the like in tight assembled relationship, said latch portion extending below said abutting surface of said base portion and said support member.

References Cited in the file of this patent

UNITED STATES PATENTS

| | | |
|---|---|---|
| 1,268,466 | Hunter | June 4, 1918 |
| 2,372,682 | Robertson | Apr. 3, 1945 |
| 2,836,215 | Rapata | May 27, 1958 |
| 2,896,889 | Hershberger et al. | July 28, 1959 |

FOREIGN PATENTS

| | | |
|---|---|---|
| 500,163 | Canada | Feb. 23, 1954 |